US012811241B2

(12) United States Patent
Otake et al.

(10) Patent No.: US 12,811,241 B2
(45) Date of Patent: Nov. 24, 2026

(54) CYLINDRICAL BATTERY

(71) Applicant: Panasonic Intellectual Property Management Co., Ltd., Osaka (JP)

(72) Inventors: Yuji Otake, Osaka (JP); Takahiro Takahashi, Osaka (JP); Tomohiko Yokoyama, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 773 days.

(21) Appl. No.: 17/917,167

(22) PCT Filed: Feb. 25, 2021

(86) PCT No.: PCT/JP2021/007135
§ 371 (c)(1),
(2) Date: Oct. 5, 2022

(87) PCT Pub. No.: WO2021/210276
PCT Pub. Date: Oct. 21, 2021

(65) Prior Publication Data

US 2023/0163408 A1 May 25, 2023

(30) Foreign Application Priority Data

Apr. 17, 2020 (JP) ................................ 2020-073751

(51) Int. Cl.
*H01M 50/383* (2021.01)
*H01M 10/04* (2006.01)
(Continued)

(52) U.S. Cl.
CPC ..... *H01M 50/383* (2021.01); *H01M 10/0422* (2013.01); *H01M 10/0587* (2013.01); *H01M 50/186* (2021.01)

(58) Field of Classification Search
CPC ............ H01M 50/461; H01M 50/536; H01M 50/466; H01M 50/459
See application file for complete search history.

(56) References Cited

U.S. PATENT DOCUMENTS 6,596,434 B1 * 7/2003 Yoshinaka ............ H01M 50/30 429/185
2006/0188779 A1 8/2006 Yoppolo et al.
(Continued)

FOREIGN PATENT DOCUMENTS

JP H09-161754 A 6/1997
JP 2001-068083 A 3/2001
(Continued)

OTHER PUBLICATIONS

Machine Translation of: Nakada et al. (JP 2001-068083 A), Mar. 16, 2001.*
(Continued)

*Primary Examiner* — Kenneth J Douyette
(74) *Attorney, Agent, or Firm* — WHDA, LLP

(57) ABSTRACT

This cylindrical battery comprises an electrode body in which a positive electrode and a negative electrode are wound with a separator interposed therebetween, an electrolyte, a bottomed cylindrical outer can accommodating the electrode body and the electrolyte, and a sealing body blocking an opening portion of the outer can, wherein: the sealing body has a cap disposed in the outermost portion of the sealing body; the cap includes a protruding portion formed in a central portion thereof; the protruding portion includes a top surface portion and a side wall portion; and a plurality of independent venting ports are formed in the top surface portion and the side wall portion.

9 Claims, 4 Drawing Sheets

(51) Int. Cl.

| | |
|---|---|
| ***H01M 10/0587*** | (2010.01) |
| ***H01M 50/186*** | (2021.01) |

(56) References Cited

U.S. PATENT DOCUMENTS

| | | | | |
|---|---|---|---|---|
| 2009/0226803 | A1 | 9/2009 | Nishino et al. | |
| 2012/0040215 | A1* | 2/2012 | Zhu | H01M 50/3425 429/56 |
| 2014/0349148 | A1 | 11/2014 | Ikeda et al. | |
| 2020/0295319 | A1* | 9/2020 | Ko | B23K 26/08 |

FOREIGN PATENT DOCUMENTS

| | | | | |
|---|---|---|---|---|
| JP | 2006-338981 | A | 12/2006 | |
| JP | 2008-530757 | A | 8/2008 | |
| JP | 2009-211909 | A | 9/2009 | |
| JP | 2012-128955 | A | 7/2012 | |
| KR | 20170133964 | A | 12/2017 | |
| KR | 20180075797 | A | 7/2018 | |
| WO | 2013/094000 | A1 | 6/2013 | |
| WO | WO-2019112160 | A1 * | 6/2019 | B23K 26/323 |

OTHER PUBLICATIONS

Office Action dated Dec. 14, 2022, issued in counterpart IN Application No. 202247056681, with English Translation. (5 pages).

International Search Report dated May 18, 2021, issued in counterpart Application No. PCT/JP2021/007135.

Written Opinion dated May 18, 2021, issued in counterpart Application No. PCT/JP2021/007135.

Extended (Supplementary) European Search Report dated Jan. 12, 2024, issued in counterpart EP Application No. 21788420.4. (8 pages).

* cited by examiner

CYLINDRICAL BATTERY

CROSS REFERENCE TO RELATED APPLICATIONS

This Application is the National Stage of International Application No. PCT/JP2021/007135, filed Feb. 25, 2021, which claims priority from Application No. 2020-073751 filed on Apr. 17, 2020 in Japan. The entire contents of these applications are incorporated herein by reference in their entirety.

TECHNICAL FIELD

The present disclosure relates to a cylindrical battery.

BACKGROUND ART

Conventionally, there has been a well-known cylindrical battery having a bottomed cylindrical exterior can and a sealing assembly which blocks an opening of the exterior can. In addition, the cylindrical battery is sometimes used as a set battery (battery pack) for which a plurality of cylindrical batteries are connected.

For the cylindrical battery, cases of resulting in ignition at the time of abnormality occurrence have been reported. When the cylindrical battery ignites, flames jet out from an exhaust port of the cylindrical battery and there is a risk that the adjacent cylindrical battery in the battery pack catches a fire. Patent Literature 1 discloses a battery pack for which a mesh member for extinguishing flames jetting out from an exhaust port of a cylindrical battery is disposed above the cylindrical battery. In addition, Patent Literature 2 discloses a configuration of providing a fire extinguisher in a battery pack.

CITATION LIST

Patent Literature

PATENT LITERATURE 1: Japanese Unexamined Patent Application Publication No.

PATENT LITERATURE 2: Japanese Unexamined Patent Application Publication No. Hei9-161754

SUMMARY

In the battery pack disclosed in Patent Literatures 1 and 2, since fire extinguishing parts are disposed as separate parts, a cost increases for increase of the number of parts compared to a normal battery pack. In addition, in the battery pack, since the fire extinguishing parts are disposed, it becomes difficult to miniaturize the battery pack and it also becomes difficult to miniaturize an apparatus into which the battery pack is to be incorporated.

A cylindrical battery which is one aspect of the present disclosure is a cylindrical battery having: an electrode assembly around which a positive electrode and a negative electrode are wound via a separator; an electrolyte; a bottomed cylindrical exterior can which houses the electrode assembly and the electrolyte; and a sealing assembly which blocks an opening of the exterior can, the sealing assembly has a cap disposed at an outermost part of the sealing assembly, the cap includes a projection formed at a center part, the projection includes a top surface part and a sidewall part, and a plurality of independent exhaust ports are formed respectively at the top surface part and the sidewall part.

According to one aspect of the present disclosure, in a case of ignition at the time of abnormality occurrence, the ignition may be extinguished by a battery alone.

DESCRIPTION OF EMBODIMENTS

Hereinafter, the embodiment of the present disclosure will be explained using the drawings. Shapes, materials and numbers explained below are examples for explanation and can be appropriately changed according to specifications of a cylindrical battery. Same signs are attached to equivalent elements in all the drawings to give the explanation below.

Figure 1:
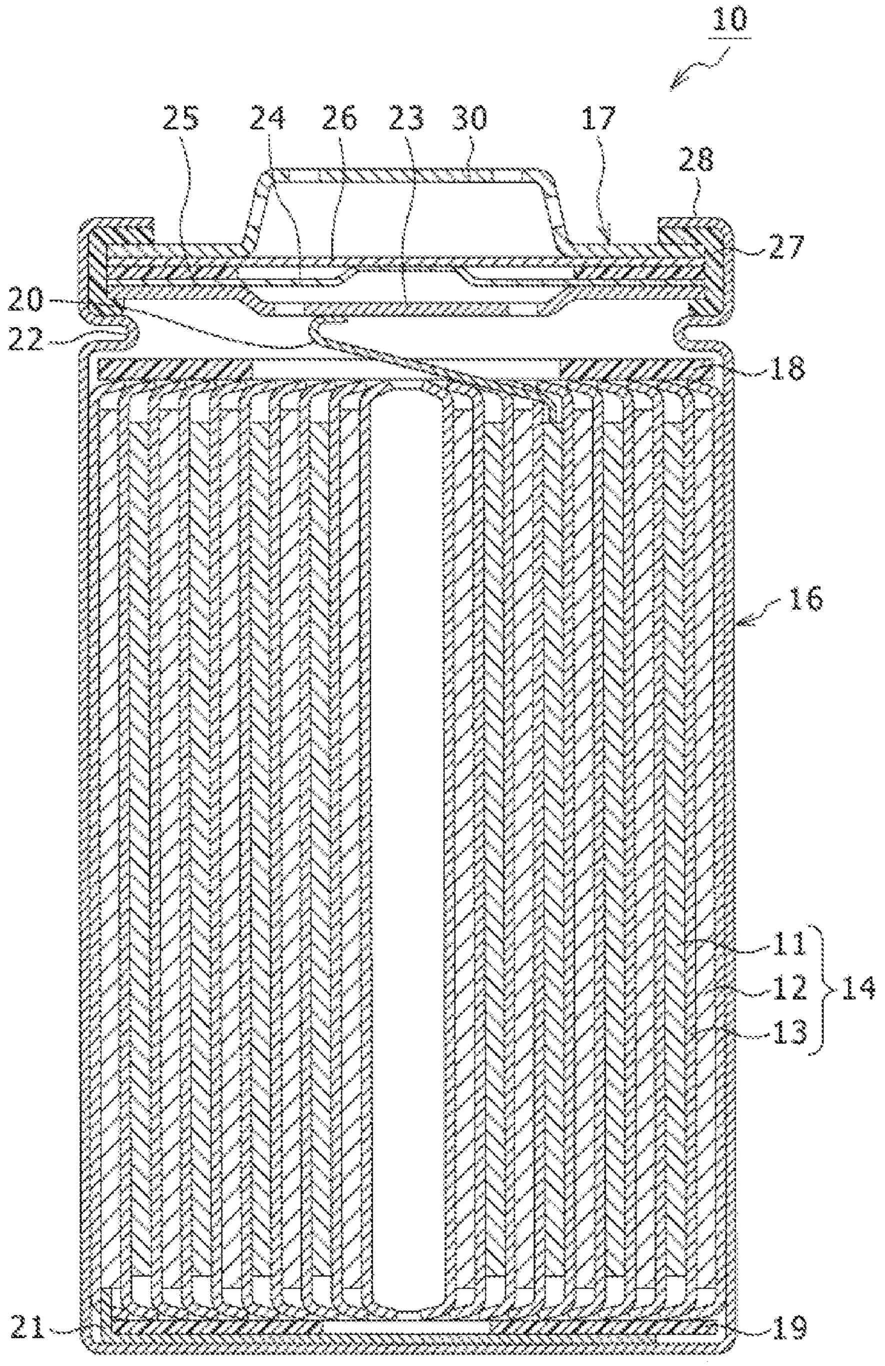
FIG. 1 is a sectional view of a cylindrical battery which is an example of an embodiment.

A cylindrical battery 10 which is an example of the present embodiment will be explained using FIG. 1. FIG. 1 is a sectional view of the cylindrical battery 10.

As illustrated in FIG. 1, the cylindrical battery 10 has an electrode assembly 14, an electrolyte, and an exterior can 16 which houses the electrode assembly 14 and the electrolyte. The electrode assembly 14 has a positive electrode 11, a negative electrode 12 and a separator 13, and has a wound structure for which the positive electrode 11 and the negative electrode 12 are wound in a helical shape via the separator 13. The exterior can 16 has a bottomed cylindrical shape which is open on one side in an axial direction, and an opening of the exterior can 16 is blocked by a sealing assembly 17.

The positive electrode 11 has a positive electrode current collector and a positive electrode mixture layer formed on at least one surface of the current collector. For the positive electrode current collector, foil of a metal which is stable in a potential range of the positive electrode 11, such as aluminum and an aluminum alloy, and a film for which the metal is disposed on a surface layer or the like can be used. The positive electrode mixture layer includes a positive electrode active material, a conductive agent such as acetylene black, and a binding agent such as polyvinylidene fluoride, and is preferably formed on both surfaces of the positive electrode current collector. For the positive electrode active material, lithium-containing transition metal composite oxide is used for example. The positive electrode 11 can be manufactured by applying positive electrode mixture slurry including the positive electrode active material, the conductive agent and the binding agent or the like on the positive electrode current collector, drying a coating film, then compressing the coating film and forming the positive electrode mixture layer on both surfaces of the positive electrode current collector.

The negative electrode 12 has a negative electrode current collector and a negative electrode mixture layer formed on at least one surface of the current collector. For the negative electrode current collector, foil of a metal which is stable in the potential range of the negative electrode 12, such as copper and a copper alloy, and a film for which the metal is disposed on the surface layer or the like can be used. The negative electrode mixture layer includes a negative electrode active material and a binding agent such as styrenebutadiene rubber (SBR), and is preferably formed on both surfaces of the negative electrode current collector. For the negative electrode active material, graphite and a silicon-containing compound or the like is used for example. The negative electrode 12 can be manufactured by applying negative electrode mixture slurry including the negative electrode active material and the binding agent or the like on the negative electrode current collector, drying a coating film, then rolling the coating film and forming the negative electrode mixture layer on both surfaces of the current collector.

For the electrolyte, a non-aqueous electrolyte is used for example. The non-aqueous electrolyte includes a non-aqueous solvent and an electrolyte salt dissolved in the non-aqueous solvent. For the non-aqueous solvent, ester, ether, nitrile, amides and a mixed solvent of two or more kinds of them may be used for example. The non-aqueous solvent may contain a halogen substitute for which halogen atoms of fluorine or the like are substituted for at least a part of hydrogen of the solvents. Note that the non-aqueous electrolyte is not limited to a liquid electrolyte and may be a solid electrolyte. For the electrolyte salt, a lithium salt such as $LiPF_6$ is used for example. The kind of the electrolyte is not limited in particular, and may also be an aqueous electrolyte.

The cylindrical battery 10 has insulating plates 18 and 19 disposed respectively above and below the electrode assembly 14. In an example illustrated in FIG. 1, a positive electrode lead 20 attached to the positive electrode 11 passes through a through-hole of the insulating plate 18 and extends to the sealing assembly 17, and a negative electrode lead 21 attached to the negative electrode 12 passes through an outer side of the insulating plate 19 and extends to a bottom part side of the exterior can 16. The positive electrode lead 20 is connected to a bottom surface of an internal terminal plate 23 disposed at an innermost part of the sealing assembly 17 by welding or the like. Thus, a cap 30 which is a top plate of the sealing assembly 17 electrically connected with the internal terminal plate 23 becomes a positive electrode external terminal. The negative electrode lead 21 is connected to a bottom part inner surface of the exterior can 16 by welding or the like. Thus, the bottom part of the exterior can 16 for example becomes a negative electrode external terminal.

The exterior can 16 is a bottomed cylindrical metal container. A gasket 27 is provided between the exterior can 16 and the sealing assembly 17, and sealability inside the battery is secured. On the exterior can 16, a grooved part 22 supporting the sealing assembly 17, for which a part of a side face part is projected to an inner side, is formed. The grooved part 22 is preferably formed in an annular shape along a circumferential direction of the exterior can 16, and supports the sealing assembly 17 with the upper surface. The sealing assembly 17 is fixed to an upper part of the exterior can 16 by the grooved part 22 and an opening end part of the exterior can 16 calked to the sealing assembly 17. At the opening end part of the exterior can 16, a calking part 28 is formed in the annular shape.

The sealing assembly 17 has a structure for which the internal terminal plate 23, a lower vent member 24, an insulating member 25, an upper vent member 26 and the cap 30 are laminated in order from the side of the electrode assembly 14. The individual members configuring the sealing assembly 17 present a disk shape or a ring shape for example, and the individual members except the insulating member 25 are electrically connected to each other. The lower vent member 24 and the upper vent member 26 are connected to each other at individual center parts, and the insulating member 25 is interposed between individual peripheral edge parts. When an internal pressure of the cylindrical battery 10 rises at the time of abnormality occurrence, the lower vent member 24 is deformed so as to push up the upper vent member 26 to the side of the cap 30 and breaks, and a current path between the lower vent member 24 and the upper vent member 26 is shut off. When the internal pressure rises further, the upper vent member 26 breaks and a gas is discharged from exhaust ports 33H and 34H to be described later of the cap 30.

Note that the structure of the sealing assembly is not limited to the structure illustrated in FIG. 1. For example, the sealing assembly may have a structure not having the internal terminal plate, and the electrode lead may be connected to the lower vent member. In addition, a vent member may be configured by one member.

Figure 2:
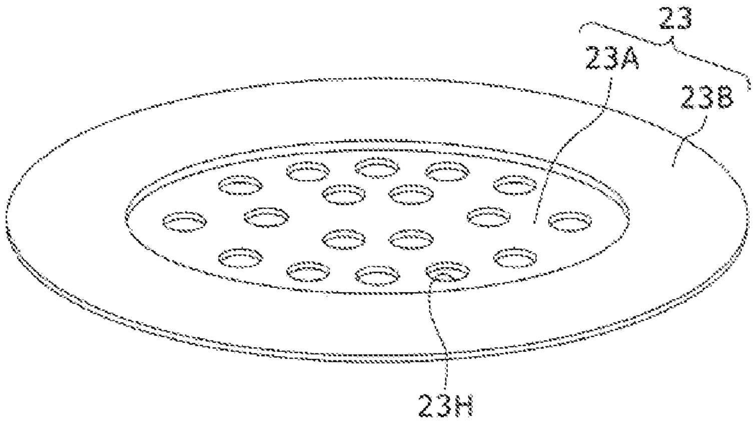
FIG. 2 is a perspective view of an internal terminal plate which is another example of the embodiment.

Using FIG. 2, another example of the internal terminal plate 23 configuring the sealing assembly 17 will be explained. FIG. 2 is a perspective view illustrating the internal terminal plate 23.

The internal terminal plate 23 is disposed at the innermost part of the sealing assembly 17 as described above. To a lower surface of the internal terminal plate 23, the positive electrode lead 20 is connected by welding or the like (see FIG. 1). As illustrated in FIG. 2, the internal terminal plate 23 includes a recess 23A formed at the center part of a metal plate and an outer peripheral part 23B formed around the recess 23A. The recess 23A is swollen to the inner side of the cylindrical battery 10. At the recess 23A, a plurality of exhaust ports 23H are formed. The exhaust ports 23H have a diameter similar to that of the exhaust ports 33H at a top surface part 33 of the cap 30 to be described later for example.

According to the internal terminal plate 23, in a case of ignition at the time of abnormality occurrence, jetting of flames can be suppressed by shutting off the flames by the recess 23A. In addition, according to the internal terminal plate 23, a temperature of the flames is lowered by absorbing heat from the jetted flames by the recess 23A and the jetting of the flames can be suppressed. Further, in the internal terminal plate 23, since the plurality of exhaust ports 23H are formed at the recess 23A, the gas generated inside the cylindrical battery 10 can be easily released to the outside at the time of abnormality occurrence.

Figure 3:
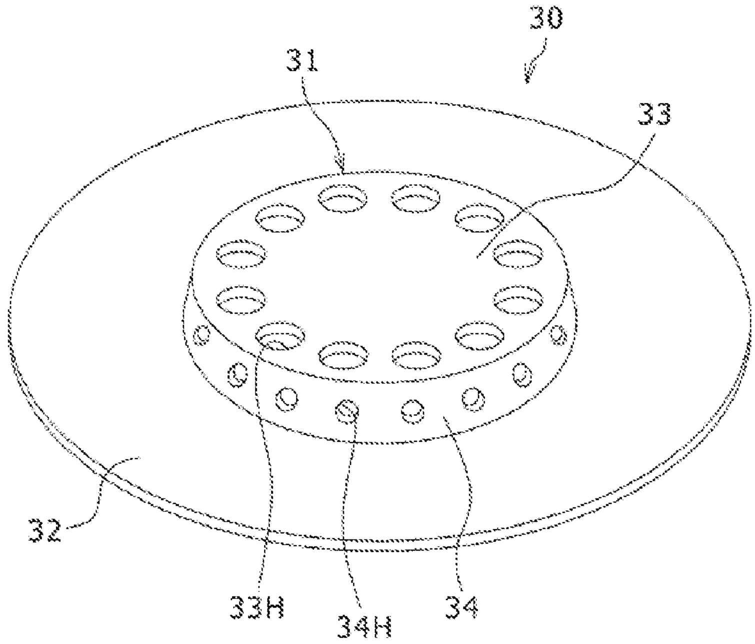
FIG. 3 is a perspective view of a cap which is an example of the embodiment.

Using FIG. 3, the cap 30 configuring the sealing assembly 17 will be explained. FIG. 3 is a perspective view illustrating the cap 30.

The cap 30 is disposed at an outermost part of the sealing assembly 17 and forms a top surface of the cylindrical battery 10. The cap 30 is a terminal for welding on a positive electrode side for connecting the cylindrical batteries 10 with each other in series or in parallel or attaching a safety element to the cylindrical battery 10 when incorporating the cylindrical battery 10 inside an apparatus for example.

As illustrated in FIG. 3, the cap 30 is formed roughly in a disk shape. In addition, the cap 30 is formed of a metal plate. A composition of the metal plate is not limited in particular, but is generally iron or an iron alloy (for example, stainless steel). An example of thickness of the metal plate is 0.1 mm-0.8 mm. The cap 30 is manufactured by deep-drawing the metal plate for example. The cap 30 includes a projection 31 formed at the center part of the metal plate and a flange part 32 formed around the projection 31.

The projection 31 is swollen to the outer side of the cylindrical battery 10. While the projection 31 of the present embodiment is swollen to the outer side of the cylindrical battery 10, the projection may be swollen to the inner side of the cylindrical battery 10. A degree (height) of swelling of the projection 31 is not limited in particular, but is about 1 mm-5 mm as an example. The projection 31 is preferably formed such that a center of the top surface part 33 coincides with a center in a radial direction of the cap 30 in a plan view. The projection 31 includes the top surface part 33 and a sidewall part 34 connected to the flange part 32.

The top surface part 33 is a part which shuts off the flames in the case of the ignition at the time of abnormality occurrence of the cylindrical battery 10, while details are to be described later, and to which a lead wire or the like is connected by welding or the like as described above. The top surface part 33 is formed roughly in a circular shape in the plan view. The top surface part 33 is flat and is formed in parallel with the flange part 32. The top surface part 33 does not need to be entirely flat, and an outer peripheral part may be chamfered for example. The top surface part 33 is preferably formed as wide as possible in consideration of a flame shutoff effect in the case of the ignition at the time of abnormality occurrence of the cylindrical battery 10 as described above and workability and welding strength of weldbonding or the like.

At the outer peripheral part of the top surface part 33, the plurality of exhaust ports 33H are formed. In the example illustrated in FIG. 3, the plurality of exhaust ports 33H are annularly formed only for one round at roughly equal intervals along the circumferential direction. The exhaust ports 33H are preferably in a perfect circle shape in the plan view, but may be polygonal, elliptic or roughly circular for example. The exhaust ports 33H are preferably formed together with exhaust ports 34H to be described later before the cap 30 is manufactured by being deep-drawn for example.

The exhaust ports 33H have the diameter of 0.01 mm-9 mm, and preferably have the diameter of 0.5 mm-3 mm. In the example illustrated in FIG. 2, the diameter of the exhaust ports 33H is 1 mm. In addition, each of the exhaust ports 33H formed at least at the top surface part 33 preferably has almost the same diameter but may has a different diameter. A sum total of an opening area of the exhaust ports 33H is formed to be 1-30 $mm^2$, and more preferably 5-15 $mm^2$. In the example illustrated in FIG. 2, the sum total of the opening area of the exhaust ports 33H is 9 $mm^2$.

A total aperture ratio of all the exhaust ports 33H at the top surface part 33 is 1-60%, and is preferably 10-30%. The total aperture ratio is a ratio of the sum total of the opening area of all the exhaust ports 33H in a surface area of the top surface part 33. In the example illustrated in FIG. 3, the total aperture ratio of the exhaust ports 33H is 24%.

The center part of the top surface part 33 has a flat top surface without the exhaust ports 33H being formed there. According to the center part of the top surface part 33, the workability at the time of weldbonding can be improved and the welding strength or the like can be improved. The center part of the top surface part 33 may be formed by forming the exhaust ports 33H in a step of manufacturing the cap 30, welding the lead wire and thereby blocking the exhaust ports 33H by the lead wire and a welded part.

The sidewall part 34 is a part which connects the flange part 32 and the top surface part 33, and is formed roughly vertically to the flange part 32. An angle formed by the sidewall part 34 to a swelling direction of the projection 31 is preferably about 90°-110°, and is more preferably about 90°-100°.

At the sidewall part 34, the plurality of exhaust ports 34H are formed. The exhaust ports 34H are preferably in the perfect circle shape in a view from a direction vertical to the sidewall part 34, but may be polygonal, elliptic or roughly circular for example. The exhaust ports 34H are preferably formed together with the exhaust ports 33H before the cap 30 is manufactured by being deep-drawn as described above.

The exhaust ports 34H have the diameter of 0.01 mm-9 mm, and preferably have the diameter of 0.5 mm-2 mm. In the example illustrated in FIG. 2, the diameter of the exhaust ports 34H is 0.5 mm. In addition, each of the exhaust ports 34H formed at least at the sidewall part 34 preferably has almost the same diameter but may has a different diameter.

A total aperture ratio of all the exhaust ports 34H at the sidewall part 34 is 1-60%, and is preferably 10-30%. The total aperture ratio is the ratio of the sum total of the opening area of all the exhaust ports 34H in the surface area of the sidewall part 34. Here, the total aperture ratio of the exhaust ports 33H at the top surface part 33 described above is preferably greater than the total aperture ratio of the exhaust ports 34H at the sidewall part 34.

While the plurality of independent exhaust ports 33H and 34H are formed at the top surface part 33 and the flange part 32 respectively at the projection 31 of the present embodiment, exhaust ports may be formed at a boundary part of the top surface part 33 and the flange part 32.

The cap 30 includes the flange part 32 formed around the projection 31 as described above. Since the flange part 32 is a part to be pressurized by the calking part 28 of the exterior can 16, it is needed to secure the flange part 32 having certain measure of width. In addition, exhaust ports may be formed at the flange part 32.

An effect of the cylindrical battery 10 will be explained. According to the cylindrical battery 10, the cylindrical battery 10 alone can extinguish the ignition at the time of abnormality.

In the cylindrical battery 10, there are cases of resulting in the ignition at the time of abnormality occurrence. In such ignition of the cylindrical battery 10, the flames jet out from an exhaust part formed by breakage of the upper vent member 26 of the cylindrical battery 10. In the cap 30 of the cylindrical battery 10, only the plurality of exhaust ports 33H and 34H are formed respectively at the top surface part 33 and the sidewall part 34 of the projection 31, and an opening of a size to allow the flames to jet is not provided compared to a conventional cap for which the exhaust ports are formed large at the sidewall part. Therefore, the jetting of the flames can be suppressed by shutting off the flames by the top surface part 33 and the sidewall part 34.

In addition, in the cap 30 of the cylindrical battery 10 of the present embodiment, the temperature of the flames is lowered by absorbing the heat from the jetted flames by the top surface part 33 and the sidewall part 34 of the projection 31, and the jetting of the flames can be suppressed.

Since the cylindrical battery 10 alone extinguishes the ignition at the time of abnormality, it is not needed to dispose fire extinguishing parts as separate parts in a battery pack for which the plurality of cylindrical batteries 10 are packaged as before. Therefore, there is no cost increase for increase of the number of parts of the battery pack. In addition, it is also possible to miniaturize the cylindrical battery or the battery pack.

Further, in the cap 30 of the cylindrical battery 10 of the present embodiment, the plurality of exhaust ports 33H and 34H are formed respectively at the top surface part 33 and the sidewall part 34 of the projection 31 so that the gas generated inside the battery can be released to the outside. In the cap 30 of the cylindrical battery 10 of the present embodiment, the plurality of exhaust ports 33H are formed also at the top surface part 33 of the projection 31, and the gas is easily released to the outside compared to a conventional cap for which the exhaust ports are formed only at the sidewall part.

Figure 4:
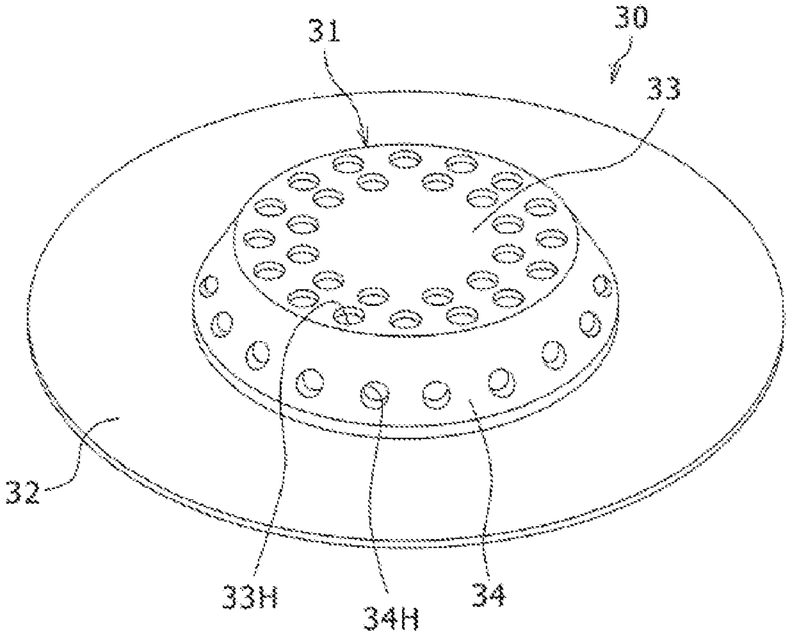
FIG. 4 is a perspective view of the cap which is another example of the embodiment.

Using FIG. 4, the cap 30 which is another example of the present embodiment will be explained. FIG. 4 is a perspective view illustrating the cap 30.

As illustrated in FIG. 4, the cap 30 is configured similarly to the above-described cap 30 illustrated in FIG. 3, except that the diameter and the number of the plurality of exhaust ports 33H formed at the top surface part 33 are different. In the example illustrated in FIG. 4, the plurality of exhaust ports 33H are annularly formed only for two rounds at roughly equal intervals along the circumferential direction. In the example illustrated in FIG. 4, the exhaust ports 33H have the diameter of 0.5 mm, the sum total of the opening area of the exhaust ports 33H is 5 $mm^2$, and the total aperture ratio of the exhaust ports 33H at the top surface part 33 is 13%. Even the cap 30 illustrated in FIG. 4 demonstrates the effect similar to that of the above-described cap 30 illustrated in FIG. 3.

Note that the present invention is not limited by the embodiment described above and the modifications and it is needless to say that various changes and improvements are possible within a range of matters described in claims of the present application.

REFERENCE SIGNS LIST

10 cylindrical battery
11 positive electrode
12 negative electrode
13 separator
14 electrode assembly
16 exterior can
17 sealing assembly
18, 19 insulating plate
20 positive electrode lead
21 negative electrode lead
22 grooved part
23 internal terminal plate
23A recess
23B outer peripheral part
23H exhaust port
24 lower vent member
25 insulating member
26 upper vent member
27 gasket
30 cap
31 projection
32 flange part
33 top surface part
33H exhaust port
34 sidewall part
34H exhaust port

The invention claimed is:

1. A cylindrical battery, having:
an electrode assembly around which a positive electrode and a negative electrode are wound via a separator;
an electrolyte;
a bottomed cylindrical exterior can which houses the electrode assembly and the electrolyte; and
a sealing assembly which blocks an opening of the exterior can,
wherein the sealing assembly has a cap disposed at an outermost part of the sealing assembly,
the cap includes a projection formed at a center part,
the projection includes a top surface part and a sidewall part,
a plurality of first exhaust ports are formed at the top surface part and a plurality of second exhaust ports separate from the plurality of first exhaust ports are formed at the sidewall part, and a lower surface of the top surface part facing the electrode assembly includes a flat surface at a center part of the projection, and
the plurality of first exhaust ports formed in the top surface part are located radially outside the center part of the projection.

2. The cylindrical battery according to claim 1,
wherein a total aperture ratio of the exhaust ports at the top surface part is greater than a total aperture ratio of the exhaust ports at the sidewall part.

3. The cylindrical battery according to claim 1,
wherein, for the top surface part, the exhaust ports are not formed at the centermost part of the top surface part.

4. The cylindrical battery according to claim 1,
wherein the sealing assembly has an internal terminal plate which is disposed at an innermost part of the sealing assembly, to which a positive electrode lead is bonded, and which forms a current path from the positive electrode lead to the cap, and
a plurality of exhaust ports are formed on the internal terminal plate.

5. The cylindrical battery according to claim 1,
wherein the cap includes a flange part formed around the projection, and
a plurality of exhaust ports are formed at the flange part.

6. The cylindrical battery according to claim 1,
wherein each exhaust port has the diameter of 0.01 mm to 9 mm.

7. The cylindrical battery according to claim 1,
wherein a total aperture ratio of all the exhaust ports is 10 to 30%.

8. The cylindrical battery according to claim 1,
wherein the center part of the projection is free of exhaust ports.

9. The cylindrical battery according to claim 4,
wherein the internal terminal plate includes a recess at the center.

* * * * *